Inventor:
Daniel F. Comstock
by Roberts, Cushman & Woodberry
attys.

Patented June 13, 1939

2,162,245

UNITED STATES PATENT OFFICE 2,162,245

HEATING AND COOLING SYSTEM

Daniel F. Comstock, Lincoln, Mass., assignor, by mesne assignments, to Stator Corporation, a corporation of Rhode Island Application October 23, 1937, Serial No. 170,633

26 Claims. (Cl. 62—115)

In the ordinary type of refrigerating system involving a cooling evaporator, a heat-dissipating condenser, and a compressor which necessarily has a relatively low efficiency and therefore dissipates a large proportion of the energy input, the heat dissipated by the condenser and compressor is wasted; and the object of the present invention is to utilize this heat for heating the water in a storage tank at a temperature suitable for household purposes.

Another object of the invention is to provide a combined refrigerating and heating system which involves few if any parts in addition to the ordinary system for producing refrigeration alone, thereby securing both refrigeration and heating with apparatus which requires an initial investment comparable to that of the ordinary refrigerating system.

A further object is to provide a system which is adapted to produce automatically either refrigeration or heating, depending upon which is needed at the time; and still another object is to pump atmospheric heat into a water tank or the like either with or without associated refrigerating apparatus.

According to this invention heat-transfer apparatus such as that commonly used for producing refrigeration is arranged for cooling a refrigerator and/or supplying heat to a hot water tank. The apparatus involves at least three heat-exchangers, one operating at a relatively low temperature for extracting heat from the refrigerator, one operating at a relatively high temperature for heating the tank water, and one operating at an intermediate temperature, preferably atmospheric temperature, although the latter may, under certain conditions, operate at a lower temperature than the cold exchanger, as will appear hereinafter.

The cold exchanger may serve as the cooler for the refrigerator or may be a separate exchanger in heat-transfer relation to the cooler. Likewise the hot exchanger may either be in direct heat-transfer relation to the tank or it may transfer its heat to the tank indirectly through a heat-transfer circuit. The intermediate or warm exchanger may serve to dissipate heat extracted from the cooler and/or to absorb heat from the atmosphere to be transferred to the tank through the hot exchanger; and it may be formed in one or two parts. When formed in two parts, one part is arranged to absorb heat and the other part is arranged to dissipate heat, the two parts being either entirely separate or having common fins. When formed in a single part, the intermediate exchanger may be arranged to be selectively connected to either the hot or the cold exchanger or it may be operatively connected to both the hot and cold exchangers in series, such as intermediate-cold-hot for heating alone or cold-hot-intermediate for cooling alone.

The aforesaid heat exchangers are preferably interconnected by fluid circuits of the type in which liquid is evaporated in one exchanger and condensed in another, thereby to transfer heat from the first to the second interchanger, and the respective exchangers may be connected in one, two or more circuits. For example, when the cold exchanger serves as the refrigerator cooler, it may be connected in only one circuit leading to a condenser; when the hot exchanger is in direct heat-transfer relation to the tank, it may be connected in only one circuit; and when the intermediate exchanger is used either to absorb or to dissipate heat, it may be connected in two circuits, one to the hot exchanger and one to the cold exchanger, the two circuits being non-intercommunicating or having a portion in common. Examples of the use of three circuits through the same exchanger are (1) three circuits from the cold exchanger to the cooler, intermediate exchanger and hot exchanger, respectively; and (2) three circuits from the hot exchanger to the cold and intermediate exchangers and the tank, respectively. In the last example the hot exchanger may have a fourth circuit connected to cooling jackets of a compressor and/or motor.

In some cases the same portion of a circuit may serve as an evaporator at one time and as a condenser at another time. For example, in a simple system in which the intermediate exchanger has a single fluid passage therethrough, this passage may serve as an evaporator when connected to the hot exchanger to heat water without producing refrigeration, and it may serve as a condenser when connected to the cold exchanger to produce refrigeration alone.

As hereinafter set forth, the hot exchanger may be either in direct heat-transfer relation to the tank or it may transfer the heat indirectly as, for example, through a fluid circuit; in the latter case the fluid transfer medium in the circuit may conveniently comprise the water to be heated. Likewise the waste heat of the compressor and/or motor may be transferred to the tank either directly or indirectly, the latter method having the advantage that the heat may more conveniently be diverted from the tank if and when desired, as, for example, by a fluid circuit leading from the hot exchanger to a dissipating exchanger.

To these ends, fluid may be passed through a heating, compression and cooling cycle, or, more specifically, through an evaporation-compression-condensation cycle to heat water or the like. During the low temperature or evaporation portion of the cycle the fluid may absorb heat at a relatively low or moderate temperature; thus household refrigeration or cooling of the air of the room may be provided. During the high temperature or condensation portion of the cycle the absorbed heat may be employed to heat water or the like at a relatively high temperature.

In the drawings:

Fig. 1a is a wiring diagram for the apparatus shown in Fig. 1;

Figure 1:
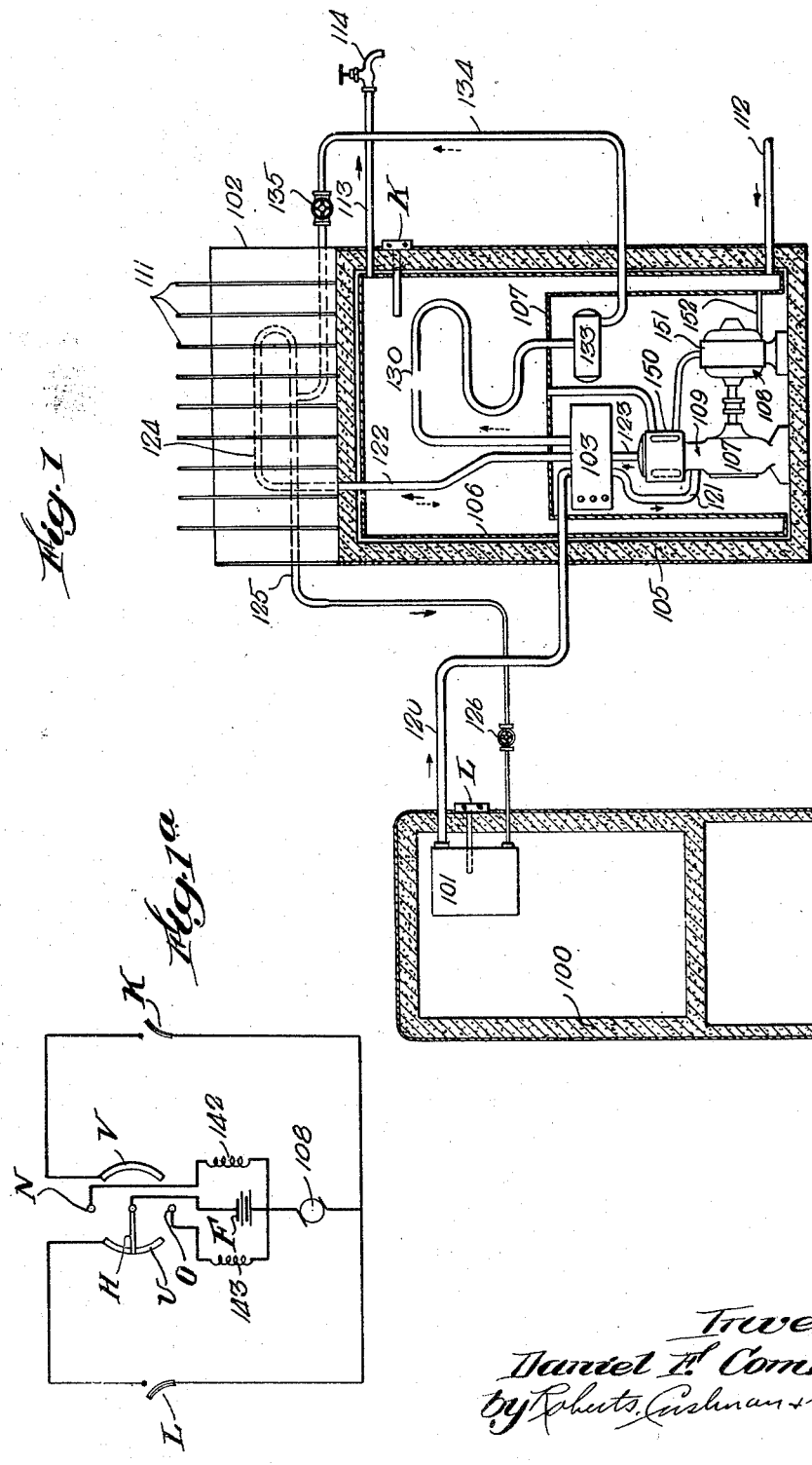
Fig. 1 is a diagrammatic view of apparatus constructed in accordance with this invention, parts being shown in section and in elevation.

The embodiment of this invention illustrated in Fig. 1 provides an arrangement whereby refrigeration may be periodically effected at a low temperature in a conventional household refrigerator and whereby the heat there absorbed may be dissipated to the surrounding atmosphere in a well known manner and whereby alternately with periods of refrigeration heat may be absorbed from the surrounding atmosphere and transmitted to the hot water tank. Preferably the compressor and its driving motor may be arranged so that heat ordinarily wasted by these factors may aid in heating the hot water tank. Various control instrumentalities may also be associated with apparatus of this character, as will be more fully described.

In Fig. 1 the numeral 100 designates a refrigerator housing which may be of conventional type having a heat exchanger or evaporator 101 located therein. Adjoining the housing 100 there may be a second housing 105 providing an insulating wall enclosing a hot water tank 106. The tank 106 may be shaped to fill the entire upper part of housing 105 and may have a hollow wall portion providing a jacket or housing around a chamber 107 in the lower part of the housing 105. An inlet pipe 112 may be connected to the lower part of tank 106, and the upper part of this tank may be connected to an outlet duct 113 provided with one or more taps or faucets 114. Within the chamber 107 may be located an electric motor 108 arranged to drive a compressor 109. A valve housing 103 may be located in the chamber 107, being connected to the compressor and to the evaporator in a manner which will be more fully described. Disposed above the housing 105 is a warm heat exchanger in the form of a tank 102 containing liquid. The exchanger 102 may have its surface exposed to the atmosphere and may be conveniently provided with heat radiating or absorbing fins 111.

For convenience of description, I shall first describe the manner in which refrigerant such as ethyl chloride may be circulated by the compressor 109 through a conventional evaporation-compression-condensation circuit to produce refrigeration for household purposes and then will describe the manner in which the fluid may be circulated by the same compressor through an evaporation-compression-condensation circuit to cool the surrounding atmosphere and to heat the water in tank 106 for household purposes. The various details of the valve housing 103 and the control means therefor will then be described in detail.

A vapor duct 120 extending from the upper part of the evaporator is connected to the valve assembly 103 which may be arranged to direct the vapor to the inlet 121 of the compressor 109 so that vapor is drawn from the evaporator 101 to the compressor and there compressed. Thus refrigeration may occur in housing 100. From the compressor the vapor passes through the outlet duct 123, then through the valve assembly 103 to the duct 122 which is connected to a coil 124 within the intermediate unit or exchanger 102. Since this unit, due to the fins 111, tends to remain at substantially atmospheric or room temperature, the vapor is condensed in the coil 124. From the latter, liquid may pass through pipe 125 to the lower part of the cooler 101, any suitable expansion or pressure control valve 126 being provided in the pipe 124 to permit the liquid to pass from the high pressure of the condenser to the evaporator at low pressure.

It is thus evident that under these conditions the refrigerant passes through a conventional refrigeration cycle, evaporation occurring in the evaporator 101, compression occurring in compressor 109, and condensation occurring in unit 102. Under these conditions the heat absorbed at low temperature in the housing 100 is dissipated by the warm unit 102 into the air of the room.

When water is to be heated, the valve assembly 103 is arranged so that duct 122 is connected to the inlet 121 of compressor 109; accordingly the coil 124 then functions as an evaporator tending to reduce the temperature of the warm or intermediate unit 102. Accordingly under these conditions heat is absorbed from the surrounding atmosphere, the fins 111 aiding this effect. Vapor thus received from the coil 124 is compressed by compressor 109 and is then emitted through outlet duct 123 to the valve assembly 103 which is conditioned so that the compressed vapor then passes to a condenser coil or hot exchanger 130 disposed in the tank 106. Thus the heat absorbed from the surrounding atmosphere is supplied to the tank 106 at a higher temperature range, being effective in heating the water for household purposes. Liquefied refrigerant from the coil 130 may flow downwardly into a storage receptacle 133 and thence pass through a pipe 134 to the lower part of the coil 124 in unit 102, a suitable pressure control valve or expansion valve 135 being provided adjoining the exchanger 102.

Thus, under this condition of operation, the refrigerant is passed through an evaporation-compression-condensation cycle so that evaporation occurs in the warm unit 102 and accordingly heat is absorbed from the surrounding atmosphere, while heat is given up by the fluid circuit to tank 106. Heat received from the surrounding atmosphere at a moderate temperature range is thus employed in heating the water at a higher temperature range.

It is evident that this arrangement is effective in permitting a conventional refrigeration system to be employed so that, due to diversion of the fluid from the conventional evaporator, it may be effective in absorbing heat from the air and in giving up heat to the hot water at a high temperature range. Thus the fluid may be passed through an evaporation-compression-condensation cycle at a relatively low temperature range to effect refrigeration in the conventional manner and alternately the same compressor may be employed to pass the fluid through an evaporation-compression-condensation cycle at a higher temperature range to effect water heating. In practice the temperature of condensation, when refrigeration is being effected, may be of the order of room temperature or somewhat thereabove; while when the fluid is being passed through the cycle to heat water, the lowest temperature or the temperature of evaporation may be somewhat below room temperature, as determined by warm exchanger 102.

In order to aid the heating of water, the cylinder of compressor 109 may be provided with a jacket 150 connected to the upper part of tank 106 while the motor 108 may be arranged to run at a temperature higher than that desired for household water and may be provided with a jacket 151 having its upper part connected to the jacket 150 and its lower part connected by a duct 152 to the lower part of tank 106. Thus these jackets and their connecting ducts are effective in receiving water from the lower part of tank 106 and in heating the same so that the major portion of the heat which is ordinarily wasted in effecting mechanical compression of the refrigerant may be conserved to heat the household water.

Figure 3:
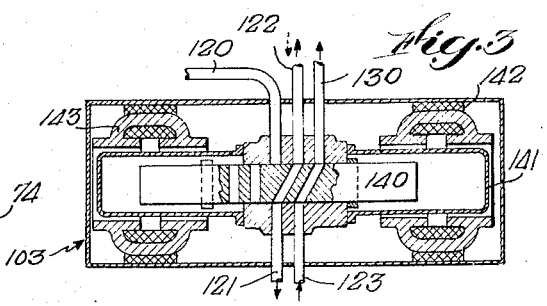
Fig. 3 is a sectional view with parts broken and shown in elevation of the valve assembly which may be employed with the apparatus illustrated in Fig. 1.

For an understanding of the control means which may be employed with a system of this character as well as of the valve arrangement within housing 103, reference may be had to Figs. 1a and 3. As shown in the latter, the valve housing may include duct connections for pipes 120, 121, 123, 130 and 122. A central plunger 140 is provided with suitable internal passages to permit the simultaneous connection of pipe 120 with pipe 121 and pipe 122 with pipe 123, or the simultaneous connection of pipe 122 with pipe 121 and of pipe 123 with pipe 130. The ends of the plunger 140 are disposed within casings 141 surrounded by solenoid magnets 142 and 143, respectively.

In the position of the parts illustrated in Fig. 3, the plunger 140 is positioned to connect pipe 121 with pipe 122 and to connect pipe 130 with pipe 123. When the plunger is moved to the other end of its path due to actuation of the solenoid 142, pipes 120 and 121, 123 and 122 may be respectively connected. A thermostatically controlled switch L (Fig. 1a) may be adapted to open in response to an undesirably low temperature of the evaporator 101, while a thermostatically controlled switch K may be arranged to open in response to an undesirably high temperature of the water tank 106. A source of electric current F may be connected at alternate periods to the motor 108 through a circuit including the switch L or through a circuit including the switch K.

When the plunger 140 is to be electrically operated, a time-clock mechanism including a rotary hand H may be connected to one side of the source of current F, being arranged during the major portion of its path to contact either a segment U in the circuit of switch L or a segment V in the circuit of switch K. After the hand H leaves the segment U, it may engage a contact N for a brief period so that a circuit is provided through the solenoid 142 to draw the plunger 140 toward the right as viewed in Fig. 3, thus to cause the connection of the various pipes to effect heating of the water in the manner already described. Thereafter the hand H leaves contact N so that neither of the solenoids is energized, but the plunger 140 remains in the same position until a second contact O is engaged after the hand H leaves segment V. This contact is arranged so that the hand may close the circuit of solenoid 143 to move the plunger 140 in the opposite direction to the position shown in Fig. 3, thus to provide connections between the pipes to effect household refrigeration in the manner already described.

During the period that the hand H engages the segment V the motor 108 may receive current unless the thermostatically controlled switch K should be automatically opened in response to an undue rise of the temperature of the water in tank 106. Under these conditions obviously the condition of thermostatically controlled switch L would not affect the operation of the motor. When the hand H engages the segment U the motor 108 will be receiving current through the circuit of switch L unless the latter should be automatically opened due to an undesirably low temperature within the refrigerating compartment 100.

It is thus evident that a control arrangement is provided permitting the automatic employment of the compressor 109 to circulate the refrigerant or mediating fluid either to provide household refrigeration or to heat water and at the same time cool or absorb heat from the air of the room in which the apparatus is located.

Figure 2:
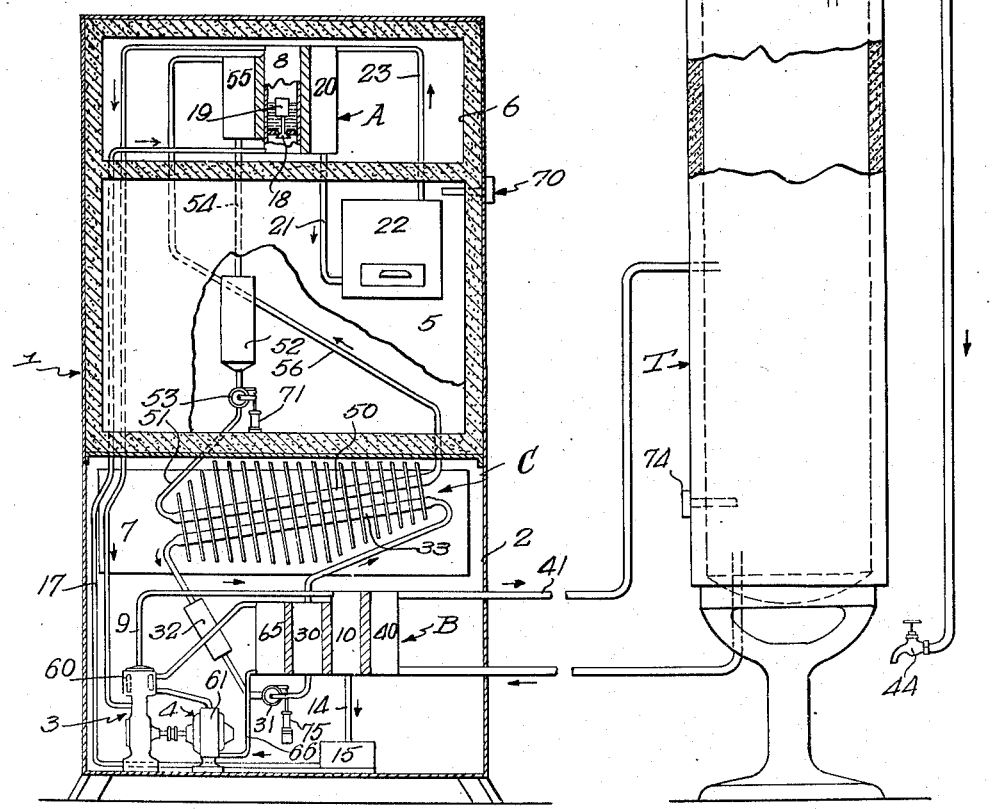
Fig. 2 is a view similar to Fig. 1, but showing an alternative type of apparatus.

The arrangement illustrated in Fig. 2 permits a low temperature for household refrigeration to be provided by the system at the same time that water in a storage tank is being heated or permits absorption of heat from the surrounding air and consequent cooling of the latter at the same time that the tank is being heated. Furthermore, this arrangement not only permits the transmission of heat from the compressor and/or the driving motor to the tank when the water of the tank is being heated, but it also permits the provision of refrigeration alone while permitting dissipation of heat from the compressor and/or the driving motor to the surrounding atmosphere. Control means may be employed with this system to be automatically responsive to the temperatures of the food compartment and of the hot water storage tank.

The housing 1 may resemble a conventional household refrigerator, being provided with an upper compartment 6, an intermediate compartment 5 in the form of a food compartment, and a lower compartment 2 containing a compressor 3 and electrical driving motor 4. Disposed behind the food compartment 5 is a hollow wall in which certain ducts and parts of the apparatus may be located, as will be described.

The compressor 3 may be of conventional type, being provided with a suction duct 7 arranged to receive vapor from a cooler 8 which is located in the upper compartment 6, the cooler 8 being a part of a cold or low temperature heat exchanger A, which will be more fully described. The compressor 3 is also connected to an outlet duct 9 which receives compressed fluid that may pass to a vessel 10 forming part of a warm heat exchanger B. As will be more fully described, the mediating fluid or refrigerant, such as ethyl chloride, may be condensed in the chamber 10, thence passing downwardly through duct 14 to a storage chamber 15. A pipe 17 extends upwardly from the storage tank 15 and communicates with the lower part of cooler 8 through a valve 18 which is controlled by a float 19. Due to the higher pressure normally existing in the condenser 16, a column of liquefied refrigerant may fill duct 17 so that liquid is admitted to the cooler 8 whenever valve 18 opens in response to lowering of the level of the liquid refrigerant in the cooler 8. Thus the compressor circuit, including cooler 8, duct 7, the compressor cylinder 3, the duct 9, the receptacle 10, the tank 15 and duct 17, is a conventional refrigeration circuit of the evaporator-compressor-condenser type.

In the upper compartment 6 the heat exchanger A includes not only the cooler 8, but also a condenser 20, the lower end of which is connected by a duct 21 to an evaporator 22, the upper portion of the latter being connected by a vapor duct 23 to the upper part of condenser 20. The evaporator 22 contains a body of liquid such as ethyl chloride and may be located within or in heat-transfer relation to the food compartment 5.

Since the apparatus may be effective in causing the development of a low temperature in the cooler 8, the temperature in the condenser 20 may fall below the temperature of the evaporator 22 so that circulation is set up in the evaporator circuit, vapor rising from liquid in evaporator 22 through the duct 23 and being condensed at the low temperature of the interchanger A, flowing downwardly in liquid form through duct 21 to the evaporator 22. Thus refrigeration may be provided for household purposes.

In order to assure the condensation of the compressed mediating fluid in chamber 10 of exchanger B, a fluid circuit is provided including a duct or compartment 30 in the exchanger B, the various parts of this hot exchanger being arranged in good heat-transfer relation to each other as in metal to metal contact. Assuming that the valve 31, adjoining the lower end of chamber 30, is open, this part of chamber 30 may be in open communication with a storage chamber 32, the upper ends of the chambers 30 and 32 communicating with a heat dissipator 33 which may be provided with suitable fins and may form a part of a warm or intermediate heat exchanger C exposed to the surrounding air. A suitable liquid such as ethyl chloride is disposed in the circuit comprising the chambers 30 and 32 and the dissipator 33. Thus when the temperature of the exchanger B rises due to the reception of compressed fluid from the compressor in the chamber 10, liquid in chamber 30 evaporates, rising to the dissipator 33 where it is condensed after giving off heat to the surrounding air. The liquefied fluid then flows downwardly into the lower part of the circuit.

When heat is being absorbed in the food compartment 5 by the evaporator 22, this heat is transmitted to the condenser 20 of heat exchanger A, the heat being there absorbed by the cooler 8 of the main evaporator-compressor-condenser circuit, and since the fluid passes through the conventional cycle, this heat, at a higher temperature, is received in the compartment 10 of the heat interchanger B. From the compartment 10 the heat may be dissipated through the dissipator 33 in the manner already described if the valve 31 is open.

The interchanger B also includes a duct portion 40 which has its lower end connected to the lower part of a storage tank T and its upper part connected through a duct 41 with the upper part of this tank. Thus water from the tank may conveniently flow through the part 40 of heat interchanger B. The tank T may be in the form of a conventional hot water storage tank, being connected to the supply means by an inlet pipe 41a and being connected to a suitable outlet pipe 43 which may be provided with one or more hot water faucets or taps 44.

When refrigeration is being effected in the manner already described and the valve 31 is open so that heat is given up to the surrounding air through the dissipator 33, the portion 40 of the heat interchanger does not tend to absorb heat if the water in tank T is also hot, since the entire exchanger B is maintained at a temperature lower than that of the water in the tank due to the loss of heat through dissipator 33. Thus under these conditions there is substantially no thermosiphonic circulation of water through the part 40 of interchanger B, and substantially all of the heat therefrom passes outwardly to the air. On the other hand, if the water in tank T were cold (for example, below the temperature of the surrounding air), heat would be absorbed by the water in chamber 40 as well as being given up through the dissipator 33. Under these conditions there is a moderate circulation of the heated water from the upper part of duct portion 40 through pipe 41 to the upper part of tank T, cold water flowing from the tank into the lower part of duct portion 40 to displace the rising heated water so that thermosiphonic circulation at a moderate rate would continue until the water in the tank attained a temperature substantially of the order of that of the interchanger B as determined by the loss of heat through the dissipator 33.

A third fluid circuit containing fluid such as ethyl chloride is also provided in the housing 1 and includes a lower portion 50 which may conveniently, although not necessarily, form a part of the exchanger C. Thus in practice the dissipator 33 and the duct 50 may be associated with common fins which tend to maintain these parts at the same temperature as the temperature of the surrounding air, although these parts may be separate, if desired. The lower portion of the duct 50 may be connected by a duct 51 to a tank or receptacle 52, a suitable valve 53 being arranged to control fluid flow through the duct 51. The upper part of receptacle 52 is connected by a pipe 54 with a chamber 55 forming a part of the heat interchanger A, it being evident that the condenser 20, cooler 8 and compartment 55 may be arranged in close metal to metal contact or good heat-transfer relation so that all parts of the exchanger A tend to have the same temperature. The upper end of the duct 50 may be connected by a vapor duct 56 to the top of chamber 55.

When it is desired to absorb heat from the surrounding air and at the same time to heat the water in tank T, the valve 53 may be opened and the valve 31 may be closed. The compressor 3 is then effective in causing evaporation to occur in cooler 8, causing the temperature thereof to fall. Accordingly liquid in the duct 50 may evaporate, flowing upwardly through duct 56 to the chamber 55 of the exchanger A. Due to the low temperature of this exchanger caused by evaporation in cooler 8, condensation of the vapor in chamber 55 may occur so that the liquefied fluid may flow downwardly, returning to the reservoir 52 and duct 50.

It is thus evident that the duct 50 acts as an evaporator in the same general manner as has been explained with reference to the cooler 22, but that the duct 50 is exposed to the surrounding air so that heat is absorbed from the same and transmitted through the exchanger A to the main refrigerating circuit. Thus as fluid passing through this circuit reaches the condensation portion of its cycle, the heat absorbed from the atmosphere in exchanger C is received by exchanger B.

Assuming the valve 31 to be closed, the temperature of the exchanger B rises so that there is thermosiphonic circulation of water from tank T through part 40, and heated water is thus supplied to the upper part of the tank. Thus when the valve 31 is closed and the valve 53 is opened, cooling of the air of the room occurs, or, in other words, refrigeration is effected to lower the room temperature, the major portion of the heat thus absorbed being ultimately received by the tank T. Under these conditions the interchanger A tends to have a temperature higher than would be the case when the valve 53 is closed so that the condenser 20 may have a higher temperature than the evaporator 22. Accordingly condensation of refrigerant in condenser 20 is no longer effective in absorbing heat received from the evaporator 22 and substantially no refrigerating effect is provided within food compartment 5. Under these conditions, therefore, refrigeration is being provided for the surrounding air while the water in tank T is being heated, but household refrigeration is not being effected.

If both valves 31 and 53 are closed, the heat exchanger A is effective in receiving heat from the evaporator 22 due to condensation in the chamber 20, while the heat of the compressed refrigerant received by exchanger B cannot pass to the dissipator 33 since its circuit is closed by valve 31. Accordingly the heat is absorbed by the duct 40 which is effective in transmitting the heat to the tank T. Thus under these conditions household refrigeration may be effected at low temperature by the evaporator 22 while the water is being heated for household purposes. When the various circuits are arranged in operative and non-operative conditions in this manner, circulation cannot occur between the exchanger C and the compartment 55 of exchanger A, since the valve 53 is closed. Accordingly substantially all of the cooling effect of the cooler 8 is employed in absorbing heat from the circuit associated with the evaporator 22 within the food compartment.

Preferably the cylinder of compressor 3 may be provided with a jacket 60, while the electric motor 4 may be provided with a jacket 61, the upper part of jacket 61 being connected to the lower part of jacket 60 and the upper part of the latter being connected to the upper end of a compartment 65 of the heat interchanger B, the lower portion of the latter being connected by a duct 66 to the lower part of jacket 61. A suitable liquid may be disposed in the jackets and may circulate so that heat radiated by the compressor and by the motor is received by the heat exchanger B. When the valve 31 is open, this heat will pass to the dissipator 33 in the same general manner as the heat from the main condenser 10, while when the valve 31 is closed, this heat is effective in causing the temperature of the water in tank T to rise (all of the compartments 10, 30, 40 and 65 of interchanger B being in heat-transfer relation to each other). Accordingly an arrangement is provided whereby the heat normally wasted by the compressor and by the electric motor may be saved and transmitted to the hot water storage tank. Accordingly a singularly effective water heating system may be provided.

If desired, the valves 53 and 31 may be manually operated, but preferably automatic means is provided for this purpose so that the valve 53 may be operable in response to the condition or temperature of evaporator 22 and accordingly in response to the temperature of the food compartment 5 while the valve 31 may be operable in response to the temperature of tank T.

Figure 2A:
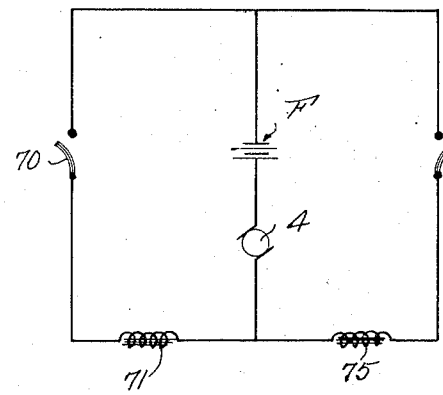
Fig. 2a is a wiring diagram for the apparatus shown in Fig. 2.

Fig. 2a affords a schematic illustration of the control means and associated wiring which may be employed with a system of the type illustrated in Fig. 2. A thermostatically controlled switch 70 may be arranged to actuate a solenoid or magnet 71 associated with the valve 53; accordingly, when the temperature of compartment 5 of cooler 22 rises above a predetermined point, the valve 53 may be automatically closed by magnet 71 to prevent the flow of fluid from the part 50 of the warm heat exchanger C to the condenser chamber 55 of the cold exchanger A. Thus the main refrigerating circuit is thereupon effective in cooling the evaporator 22 through the cold exchanger A. The switch 70 is not only located in the circuit of magnet 71 but also is connected to the motor 4 so that the motor is receiving electrical energy whenever the valve 53 is closed by the magnet. The control element for this valve may be provided with spring means to assure automatic opening as soon as the magnet 71 is deenergized due to the opening of the thermostatically controlled switch 70.

A similar circuit is provided for the thermostatically controlled switch 74 which is in series with a magnet 75 associated with the valve 31. Thus when the temperature of the tank T falls below a determined point, the switch 74 may be closed and the magnet 75 energized to cause the closing of valve 31, thus preventing heat flow from the hot exchanger B to the warm exchanger C. Accordingly, under these conditions heat may be received by the portion 40 of exchanger B and thus be supplied to the water in tank T. The magnet 75 is arranged in series with the motor 4 so that the motor may receive electrical energy whenever the temperature of the water in the tank falls below the desired point. It is evident that this control means automatically assures the operation of compressor 3 whenever either household refrigeration is needed or heating of the water in tank T is desired, and that the valves 53 and 31 are automatically controlled so that both refrigeration within food compartment 5 and heating of the water in tank T may be provided when desirable, or so that the tank T may be heated without the provision of a refrigerating effect in the food compartment 5, or so that refrigeration in compartment 5 may be effected without the heating of the water when this should prove desirable.

From the foregoing it will be evident that heat may be pumped selectively, either from the intermediate exchanger to the hot exchanger and thence to the tank, or from the cold exchanger to one of the other exchangers (the intermediate exchanger C or the hot exchanger B in Fig. 2). It will also be evident that this selection may be effected automatically. Thus in Fig. 2, when the tank water has been heated to the desired point, the intermediate exchanger C is substituted for the tank by opening valve B, in response to the temperature (or pressure) in the tank, thereby shunting the hot exchanger heat from the tank to the atmosphere; and when the refrigerator has been cooled to the desired point, the intermediate interchanger C may be substituted for the cooler by opening the valve B, in response to the temperature (or pressure) in the refrigerator, thereby drawing heat from the intermediate exchanger instead of the cooler because the exchanger is at a higher temperature.

It should be understood that the present disclosure is for the purpose of illustration only and that this invention includes all modifications and equivalents which fall within the scope of the appended claims.

I claim:

1. Apparatus for heating household water or the like, comprising a fluid circuit including a compressor, a unit for cooling compressed fluid and a heat-absorbing portion arranged to receive heat at a temperature range below that at which the water is being heated, a housing for said heat-absorbing portion, a hot water storage tank arranged to receive heat from said unit, a driving motor for the compressor, and thermostatic control means to stop operation of the motor and compressor in response to either an undesirably low temperature of the heat-absorbing portion or an undesirably high temperature of the tank.

2. Combined refrigerating and water heating system comprising an evaporator, a compressor, an intermediate unit, a hot water storage tank, and connecting ducts provided with valve means capable of being set to cause mediating fluid being drawn to the compressor to cool the evaporator and to permit the intermediate unit to cool the compressed fluid before it returns to the evaporator, said means also being capable of being set to permit mediating fluid being drawn to the compressor to cool said unit, and to permit the storage tank to absorb heat from the compressed fluid before it returns to said unit.

3. Combined refrigerating and water heating system comprising an evaporator, a compressor, an intermediate unit, a hot water storage tank, and connecting ducts provided with valve means capable of being set to cause fluid being drawn to the compressor to cool the evaporator and to permit the intermediate unit to cool the compressed fluid before it returns to the evaporator, said means also being capable of being set to permit fluid being drawn to the compressor to cool said unit and to permit the storage tank to absorb heat from the compressed fluid, said means also being capable of being set to permit fluid being drawn to the compressor to cool said evaporator, and to permit the storage tank to absorb heat from the compressed fluid before it returns to the evaporator.

4. Apparatus of the class described comprising a fluid circuit including an evaporator, a compressor and a unit adapted to act as a condenser or as an evaporator, a second fluid circuit having parts in common with said first circuit including the compressor and said unit, the second circuit also including a condenser, a hot water storage tank in heat-transfer relation to said condenser, control means operable to direct fluid through either the first or the second circuit either to produce refrigeration or to heat water in the tank, and thermostatic controls associated with the evaporator and the tank respectively and being capable of interrupting operation of the compressor when the control means is directing fluid through the corresponding circuit, whereby over-cooling of the evaporator or overheating of the tank is prevented.

5. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, and a third circuit including a condenser and a vaporizer in heat-transfer relation to the condenser of the first circuit.

6. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, a third circuit including a condenser and a vaporizer in heat-transfer relation to the condenser of the first circuit, a hot water storage tank, and a fourth circuit associated with the tank and containing liquid and being arranged, to permit the circulation of the liquid to transfer heat from the first-named condenser to the tank.

7. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, and a third circuit including a condenser and a vaporizer in heat-transfer relation to the condenser of the first circuit, a liquid-containing jacket associated with the compressor arranged in heat-transfer relation to the vaporizer of the third circuit.

8. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, a third circuit including a condenser and a vaporizer in heat-transfer relation to the condenser of the first circuit, a driving motor for the compressor, and liquid-containing jackets associated with the compressor and motor and in heat-transfer relation to the vaporizer of the third circuit.

9. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, a third circuit including a condenser and a vaporizer in heat-transfer relation to the condenser of the first circuit, an additional circuit including an evaporator and a condenser in heat-transfer relation to the evaporator of the first circuit, a hot water storage tank in heat-transfer relation to the condenser of the first circuit, and valve means controlling flow of fluid through the third circuit and through said additional circuit.

10. Apparatus of the class described comprising a circuit including an evaporator, a compressor, and a condenser, a second circuit including a cooler and a second condenser in heat-transfer relation to the evaporator of the first circuit, a refrigerator housing surrounding said cooler, a third circuit including a condenser and a vaporizer in heat-transfer relation to the condenser of the first circuit, an additional circuit including an evaporator and a condenser in heat-transfer relation to the evaporator of the first circuit, a hot water storage tank in heat-transfer relation to the condenser of the first circuit, valve means controlling flow of fluid through the third circuit and through said additional circuit, and a jacket for the compressor in heat-transfer relation to the condenser of the first circuit.

11. Apparatus for producing refrigeration and hot water for household purposes, comprising a cooler, a hot water tank, a heat exchanger out of direct heat-transfer relation to said cooler and tank, a condenser in heat-transfer relation to said tank, and means for selectively pumping heat from the cooler or from the exchanger to the condenser and thence to the tank.

12. Apparatus for producing refrigeration and hot water for household purposes, comprising a cooler, a hot water tank, a heat exchanger out of direct heat-transfer relation to said cooler and tank, a condenser in heat-transfer relation to said tank, and means including a compressor for selectively pumping heat from the cooler or from the exchanger to the condenser and thence to the tank, the compressor being in heat-transfer relation to the tank so that the waste heat of the compressor may be transferred to the tank.

13. Apparatus for producing refrigeration and hot water for household purposes, comprising a cooler, a hot water tank, a heat exchanger out of direct heat-transfer relation to said cooler and tank, a condenser in heat-transfer relation to said tank, means for selectively pumping heat from the cooler or from the exchanger to the condenser and thence to the tank, means responsive to the condition of the tank for causing heat to be pumped from the exchanger to the condenser without pumping substantial heat from the cooler, and means responsive to the condition of the cooler for causing heat to be pumped from the cooler to the condenser.

14. Apparatus for producing refrigeration and hot water for household purposes, comprising a cooler, a hot water tank, a heat exchanger out of direct heat-transfer relation to said cooler and tank, a condenser, means for selectively transferring heat from the condenser to the tank or to an external cooling medium, means for selectively pumping heat from the cooler or the exchanger to the condenser, means responsive to the condition of the tank for causing heat to be pumped from the exchanger to the condenser, and means responsive to the condition of the cooler for causing heat to be pumped from the cooler to the condenser and thence to said cooling medium without pumping substantial heat to the tank.

15. Apparatus for producing refrigeration and hot water for household purposes, comprising a cooler, a hot water tank, a heat exchanger out of direct heat-transfer relation to said cooler and tank, a condenser, means for selectively transferring heat from the condenser to the tank or to an external cooling medium, means for selectively pumping heat from the cooler or the exchanger to the condenser, means responsive to the condition of the tank for causing heat to be pumped from the exchanger to the condenser without pumping substantial heat from the cooler, and means responsive to the condition of the cooler for causing heat to be pumped from the cooler to the condenser and thence to said cooling medium without pumping substantial heat to the tank.

16. Apparatus for producing refrigeration and hot water for household purposes, comprising a cooler, a hot water tank, a condenser in heat-transfer relation to said tank, a fluid circuit containing a fluid which is evaporated to absorb heat from the cooler and condensed in said condenser, means including a second fluid circuit for diverting the condenser heat from said tank, means including a third fluid circuit for supplying atmospheric heat to said condenser, and a single compressor for producing circulation in said circuits.

17. Apparatus for producing refrigeration and hot water for household purposes, comprising a cooler, a hot water tank, a condenser in heat-transfer relation to said tank, a fluid circuit containing a fluid which is evaporated in response to heat from the cooler and condensed in said condenser, means including a second fluid circuit for diverting the condenser heat from said tank, means including a third fluid circuit for supplying atmospheric heat to said condenser, a single compressor for producing circulation in said circuits, and means for selectively controlling the circulation in said second and third circuits.

18. Apparatus for producing refrigeration and hot water for household purposes, comprising a cooler, a hot water tank, a condenser in heat-transfer relation to said tank, a fluid circuit containing a fluid which is evaporated in response to heat from the cooler and condensed in said condenser, means including a second fluid circuit for diverting the condenser heat from said tank, means including a third fluid circuit for supplying atmospheric heat to said condenser, a single compressor for producing circulation in said circuits, the compressor being in heat-transfer relation to said tank so that the waste heat of the compressor may be transferred to the tank.

19. Apparatus of the character referred to comprising cold, warm and hot heat interchangers, fluid circuits interconnecting said interchangers, a regulator for controlling the flow in the circuit interconnecting the cold and warm interchangers, a second regulator for controlling the flow in the circuit interconnecting the warm and hot interchangers, and a compressor for selectively producing flow in said circuits respectively as determined by said regulators.

20. Apparatus for producing refrigeration and hot water for household purposes, comprising a refrigerator, a hot water tank, a heat interchanger out of direct heat-transfer relation to said refrigerator and tank, means including a compressor transferring heat from the refrigerator to the interchanger, and means including the same compressor for transferring heat from the interchanger to the tank.

21. Apparatus for producing refrigeration and hot water for household purposes, comprising a cooler, a hot water tank, a heat interchanger out of direct heat-transfer relation to said refrigerator and tank, means including a compressor for transferring heat from the cooler to the tank concomitantly to produce refrigeration and hot water, the compressor being in heat-transfer relation to said tank so that the waste heat of the compressor may be transferred to the tank, means for substituting said interchanger for the tank to produce refrigeration substantially alone, and means for substituting said interchanger for the cooler to produce hot water substantially alone.

22. Apparatus for producing refrigeration and hot water for household purposes, comprising a cooler, a hot water tank, a heat interchanger out of direct heat-transfer relation to said refrigerator and tank, means including a compressor for transferring heat from the cooler to the tank concomitantly to produce refrigeration and hot water, means for adding the waste heat of the compressor to that supplied to the tank, means for substituting said interchanger for the tank to produce refrigeration substantially alone, and means for substituting said interchanger for the cooler to produce hot water substantially alone.

23. Apparatus for producing refrigeration and/or hot water for household purposes, comprising a cooler, a hot water tank, a heat interchanger associated with said cooler, a second heat interchanger associated with said tank, a third heat interchanger associated with each of said interchangers, means for transferring heat from said cooler through said first, second and third interchangers successively to produce refrigeration, and means for transferring heat through said third, first and second interchangers successively to produce hot water.

24. Apparatus for producing refrigeration and/or hot water for household purposes, comprising a cooler, a hot water tank, a heat interchanger associated with said cooler, a second heat interchanger associated with said tank, a third heat interchanger associated with each of said interchangers, means for transferring heat from said cooler through said first, second and third interchangers successively to produce refrigeration, and means for transferring heat through said third, first and second interchangers successively to produce hot water, said means including a fluid circuit interconnecting the first and second interchangers, means for producing circulation therein, said circulating means being in heat-transfer relation to said second interchanger so that the waste heat therefrom may be transferred to said tank.

25. Apparatus for producing refrigeration and hot water for household purposes, comprising a refrigerator, a hot water tank, a heat interchanger out of direct heat-transfer relation to said refrigerator and tank, means for selectively transferring heat from the refrigerator to the interchanger and from the interchanger to the tank, means responsive to the condition of the refrigerator for controlling the transfer of heat from the refrigerator to the interchanger, and means responsive to the condition of the water in said tank for controlling the transfer of heat from the interchanger to the water.

26. Apparatus for producing hot water for household purposes, comprising a hot water tank, a heat interchanger for absorbing heat from the atmosphere, means for transferring said heat to the water in said tank, and means responsive to the condition of the water in the tank for controlling the heat transferring means.

DANIEL F. COMSTOCK.